(12) United States Patent
Mergenthaler

(10) Patent No.: US 8,459,907 B2
(45) Date of Patent: Jun. 11, 2013

(54) CHIP-REMOVING TOOL

(75) Inventor: Peter Karl Mergenthaler, Markt Bibart (DE)

(73) Assignee: Kennametal Inc., Latrobe, PA (US)

( * ) Notice: Subject to any disclaimer, the term of this patent is extended or adjusted under 35 U.S.C. 154(b) by 317 days.

(21) Appl. No.: 12/991,270

(22) PCT Filed: Jun. 5, 2009

(86) PCT No.: PCT/EP2009/004029
§ 371 (c)(1),
(2), (4) Date: Jan. 20, 2011

(87) PCT Pub. No.: WO2009/146923
PCT Pub. Date: Dec. 10, 2009

(65) Prior Publication Data
US 2011/0106105 A1    May 5, 2011

(30) Foreign Application Priority Data
Jun. 6, 2008   (DE) .......................... 10 2008 027 009

(51) Int. Cl.
*B23C 5/22* (2006.01)

(52) U.S. Cl.
CPC ........................................ *B23C 5/22* (2013.01)
USPC ............. 408/231; 407/115; 407/113; 407/42; 407/50

(58) Field of Classification Search
USPC ............. 407/40, 41, 42, 47, 49, 50, 113, 114, 407/115; 408/66, 231
IPC ................................................ B23C 5/20,5/22
See application file for complete search history.

(56) References Cited

U.S. PATENT DOCUMENTS

| 3,178,801 | A | | 4/1965 | Krueger | |
|---|---|---|---|---|---|
| 3,407,467 | A | * | 10/1968 | Wirfelt | 407/114 |
| 3,629,919 | A | * | 12/1971 | Trevarrow, Jr. | 407/103 |
| 3,981,057 | A | | 9/1976 | Koppers | |
| 5,006,020 | A | * | 4/1991 | Roos | 407/113 |
| 5,876,160 | A | * | 3/1999 | Johnson | 409/132 |
| 2004/0028486 | A1 | * | 2/2004 | Englund | 407/90 |
| 2007/0077130 | A1 | * | 4/2007 | Ley | 407/114 |
| 2008/0056831 | A1 | * | 3/2008 | Wiman et al. | 407/102 |

FOREIGN PATENT DOCUMENTS

| DE | 1140045 B | 11/1962 |
|---|---|---|
| DE | 2455612 A1 | 5/1976 |
| DE | 148314 | 5/1981 |
| DE | 157314 | 11/1982 |
| EP | 0242343 A1 | 10/1987 |
| WO | 02058868 A1 | 8/2002 |

* cited by examiner

Primary Examiner — Daniel Howell
Assistant Examiner — Alan Snyder
(74) Attorney, Agent, or Firm — Larry R. Meenan, Esq.

(57) ABSTRACT

A cutting insert has the geometry of a tetrahedron with triangle base areas wherein each triangle base area has a tetrahedral frustum as a clamping body for fixing the cutting insert in a tool seat of a carrier tool. Additionally, a tool seat for the cutting insert includes clamping jaws to secure the cutting insert.

18 Claims, 4 Drawing Sheets

CHIP-REMOVING TOOL

BACKGROUND OF THE INVENTION

1. Field of the Invention

Figure 1:
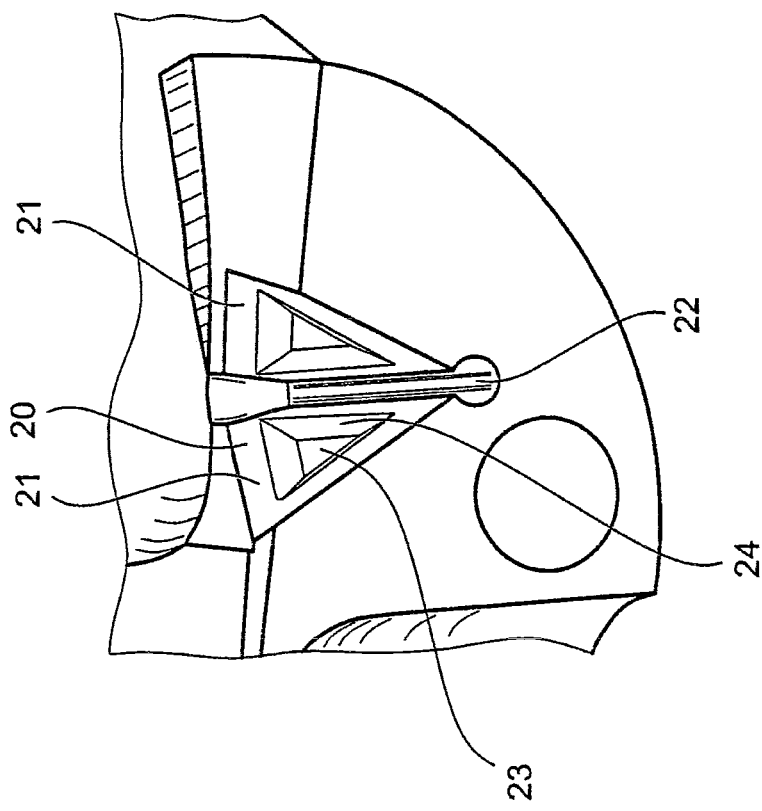
Figure 1:
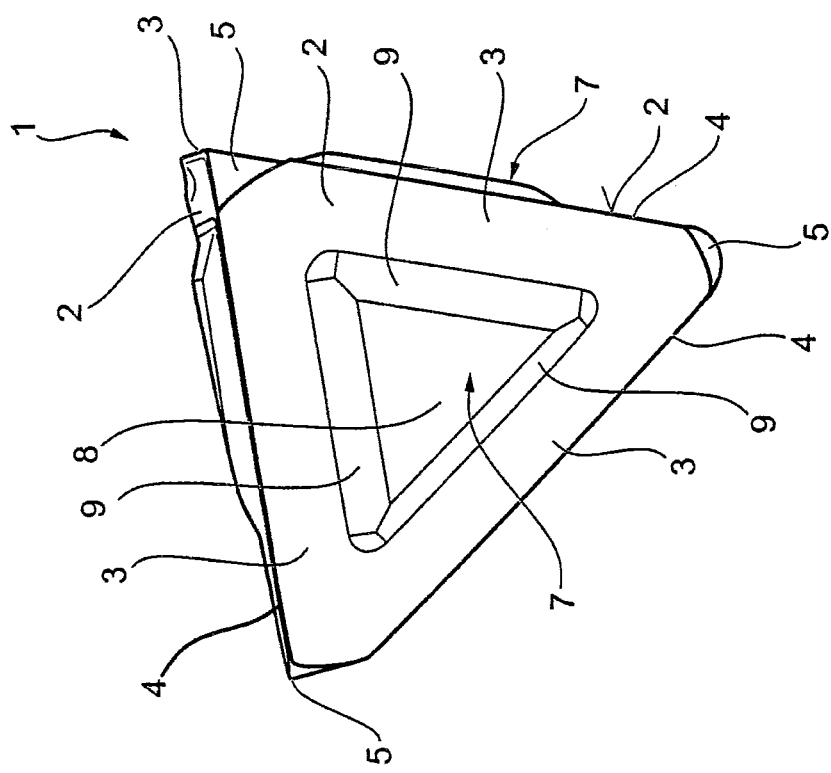

The invention relates to a cutting insert for a cutting tool, a tool seat for such a cutting insert, and a cutting tool having such a cutting insert, in particular a boring tool.

2. Description of the Related Art

In the field of machining technology, it is known not to form the cutting lip of a tool in one piece with the tool, but rather to design it as a separate component in the form of a cutting tip, an indexable cutting tip or a cutting body as cutting insert. Such a cutting body is known, for example, from DD 157 314 A.

The cutting inserts are used in special tools and in tools for producing relatively large lot sizes. As soon as the cutting lips located on the cutting insert are worn, the cutting insert is removed from the tool and replaced by a new cutting insert. There are therefore no downtimes for the regrinding of the tool. In addition, such cutting inserts are especially suitable for cutting lips made of special materials, for example carbide, cermet or ceramic, and for cutting lips set with diamond or similar materials. The cutting inserts can be both coated and uncoated. Here, the cutting insert can be made of the usually costly cutting material that is difficult to produce, whereas the tool can otherwise be made of a more cost-effective material that is simpler to produce. It is therefore also possible by means of the cutting inserts to produce special tools having cutting lips matched very specifically to the respective application.

The advantage of cutting inserts having a plurality of cutting lips working independently of one another, which are normally designated as indexable cutting tips, lies in the multiple applicability of the insert. Here, the material utilization is especially good. With respect to the material quantity used for the production of the cutting insert body, the proportion taken up by the cutting lips in such a multi-lip cutting insert is especially high.

According to the prior art, in order to fix the cutting body, a tool seat designed to be complementary to the geometry of the cutting body is provided on the tool. It is known, for example, from DD 148 314 A1 to fix a tetrahedral cutting insert in a tool seat by means of a pivotable clamping shoe. A disadvantage in this case is the large amount of space required by the clamping shoe. In addition, it is not possible to arrange an effective surface of the tool, for example a main or secondary cutting lip, in the region of the clamping shoe. An innately space-saving configuration of the tool seat is known from DE 1 140 045 B. A tetrahedral cutting body is again mounted there in a corresponding tool seat. A clamping element designed as a screw bolt serves for clamping the cutting body. The screw bolt is mounted such that it can be screwed back and forth in the tool by means of a screwing passage made in the tool. A disadvantage in this case is the weakening in the strength of the tool which inevitably accompanies the making of the screwing passage. In addition, the screwing passage and the screw bolt cannot be reduced in size in any desired manner in order to be able to still apply the requisite clamping forces via the screw bolt on the one hand and in order to be able to still usefully manipulate the screw bolt on the other hand. DE 24 55 612 A1 shows a similar design, which again requires a clamping element and a corresponding accommodating space for the clamping element on the tool in order to be able to clamp the cutting insert.

The object of the invention is to configure a cutting insert in such a way that it can be fitted in the tool in a simple manner and at the same time is easy to manipulate.

SUMMARY OF THE INVENTION

The invention first of all consists in a cutting tool as claimed in claim 1, said cutting tool being developed by the combination of features in claims 2 to 11. Furthermore, an inventive tool seat specifically adapted for such a cutting insert is specified in claims 12 and 13. Finally, an inventive cutting tool, in particular a boring tool having a cutting insert according to the invention and optionally a tool seat according to the invention, is claimed in claims 14 to 15.

The cutting insert according to the invention has the geometry of a tetrahedron. The tetrahedral cutting insert has the advantage of high stability. Since the cutting insert, with respect to the material quantity used, has a low volume, it is very stable and robust. As a result of the tetrahedral geometry, the cutting body has four cutting corners which can be specially designed for machining purposes.

The tetrahedral cutting insert is especially suitable for self-clamping fixing in the tool seat of a cutting tool. The other features of the cutting insert serve to improve the self-clamping seating of the cutting insert in the tool seat. The fact that most of the base area of each triangle forming the tetrahedron is not required for forming cutting lips, cutting corners or projections for the purpose of the chip breaking or the chip forming is utilized in an inventive manner for improving the self-clamping behavior of the cutting insert. A further clamping body for fixing the cutting insert in a tool seat is provided on that region of the triangle base area which is not required for the aforementioned purposes. According to the invention, this clamping body is configured as a tetrahedral frustum.

In an advantageous manner from the production point of view, the geometry of an equilateral triangle is selected for the tetrahedral frustum, wherein the sides of the tetrahedral frustum run parallel to the triangle sides of the base areas of the tetrahedral cutting insert. If the cutting insert is to be reworked after production, it is possible, for example, to machine both the edges of the triangle sides which form the cutting edges and the sides of the tetrahedral frustum in one operation using the same tool. In addition, this configuration strictly follows the idea of the preferred use of a regular solid as cutting insert.

This is because, in a preferred configuration of the invention, the cutting insert is configured as a "Platonic solid", that is to say as a regular tetrahedron. A regular tetrahedron consists of four congruent equilateral triangles (cf. BROCK-HAUS-Naturwissenschaft und Technik, Wiesbaden, 1983, vol. 4, page 185—ISBN 3-7653-0357-7).

In a further configuration, the frustum side faces of the tetrahedral frustum, which taper toward the top surface of the tetrahedral frustum, serve as clamping surfaces for fixing the cutting insert in the tool seat. The frustum side faces advantageously have an angle of inclination toward the top surface of the tetrahedral frustum of less than 11° in the effective direction or effective plane. Such a configuration firstly ensures that the cutting insert can be interchangeably removed from or inserted into the tool seat in an effective manner. Secondly, this angular dimension ensures especially stable self-locking of the cutting insert in the tool seat. As a result of the self-locking seating of the cutting insert in the tool seat, space-wasting further fixing means for the cutting insert can be dispensed with. This firstly simplifies the configuration of the tool seat and secondly accelerates the changing of the cutting insert, because no further fastening operations are necessary after the insertion of the cutting insert.

In a regular tetrahedral cutting insert, the four nodal points of in each case three abutting triangle sides form four identically configured cutting lip corners. The six triangle sides form in each case identically configured cutting lips or cutting edges.

As a result of the large number of cutting lips, one and the same cutting insert can advantageously be used for a multiplicity of cutting operations. Due to the low volume of the cutting insert, the amount of material used for manufacturing it is very small. For example, if such a cutting insert is produced from carbide, a relatively small amount of expensive carbide material is required in order to produce the multi-lip cutting insert.

As a result of its high inherent stability and as a result of the multiplicity of cutting lips, a comparatively large number of cutting operations can be carried out with a single cutting insert. The number of cutting operations per cutting insert is therefore significantly increased compared with the prior art.

To stabilize the cutting edges forming the cutting lips of the cutting insert, cutting lip bevels are provided in an advantageous configuration. It may also be expedient to provide edge rounding in the region of the cutting lips or of the cutting lip corners. To ensure rapid chip removal, chip disposal troughs are located behind the cutting edges in an advantageous configuration. The chip flow behavior can be improved further by providing chip breakers, chip formers or similarly effective projections. It is especially advantageous to arrange such projections in each case at uniform distances apart. In this way, the projections are statistically equally distributed over the length of the cutting lip.

In an especially preferred embodiment of the invention, 3% to 20% of the length of each cutting edge is provided with a projection. It has also turned out to be highly effective for exactly 5% of the length of the cutting edge to be provided with a respective projection which has the function of a chip former or of a chip breaker or a double function of chip forming and chip breaking. In a further configuration, it is also possible to design one or more projections as a step-type chip breaker.

The tool seat as claimed in claims 12 and 13 complements the invention in an inventive manner. The essential idea consists in designing the tool seat to be complementary to the cutting insert. For the cutting insert in question here, this means that the tool seat is of especially simple design. This is because only two triangle areas adapted to the angular relationships at the cutting insert are required. The triangle areas must be arranged relative to one another at an angle which clamps the two triangle areas of the cutting insert between them. If a regular solid having equilateral triangles as base areas is used for the cutting insert, all the interior angles of the triangular base areas are 60°. For the clamping jaws, this means that clamping jaws having the geometry of equilateral triangles or approximately equilateral triangles are also used for the clamping seat. In this case, regions can be cut out of the triangle in order to allow the cutting insert to project from the clamping slot. The clamping jaws are then in turn at an angle of 60°, or at a slightly smaller angle, to one another. Provided between the clamping jaws is a clamping slot, which allows the clamping jaws to spring apart, so that said clamping jaws can develop their clamping action with regard to the cutting insert.

It is especially advantageous to form accommodating pockets in the clamping jaws, said accommodating pockets corresponding in their hollow form in a complementary manner to the volumetric form of the clamping bodies arranged on the triangle base areas. An accommodating pocket having the outline shape of an equilateral triangle is also especially preferred again here, said equilateral triangle tapering in the direction of the clamping jaw interior at an angle of 11° or at a slightly smaller angle.

When the cutting insert is resting in the tool, the chip troughs or step-type chip breakers located behind the cutting lip obtain a double function. This is because they bear against the clamping jaws and form an additional support margin for the cutting insert in the tool seat.

Claims 14 and 15 relate to a cutting tool, in particular a boring tool having a cutting insert according to the invention and advantageously a tool seat according to the invention. The combination of cutting insert and tool seat used is very space-saving. This enables the areas in the region of the tool cutting lips to be used in another way. For example, it is possible to form cooling passages in the cutting tool, said cooling passages having an enlarged cross section compared with the prior art. In this way, the cooling effect or the cooling/lubricating effect of the cutting tool can be significantly improved. In particular in the case of boring tools, this can considerably accelerate the boring operation.

BRIEF DESCRPTION OF THE DRAWINGS

Figure 2:
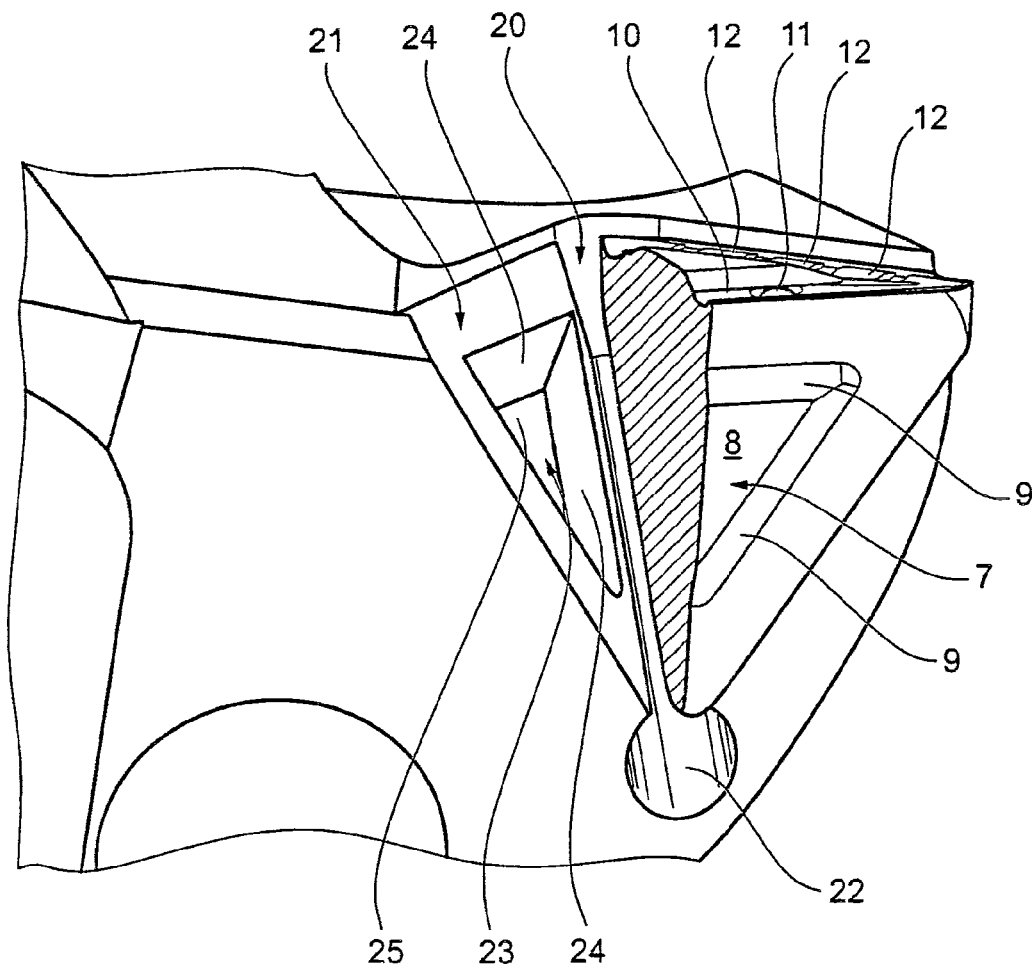
Figure 3:
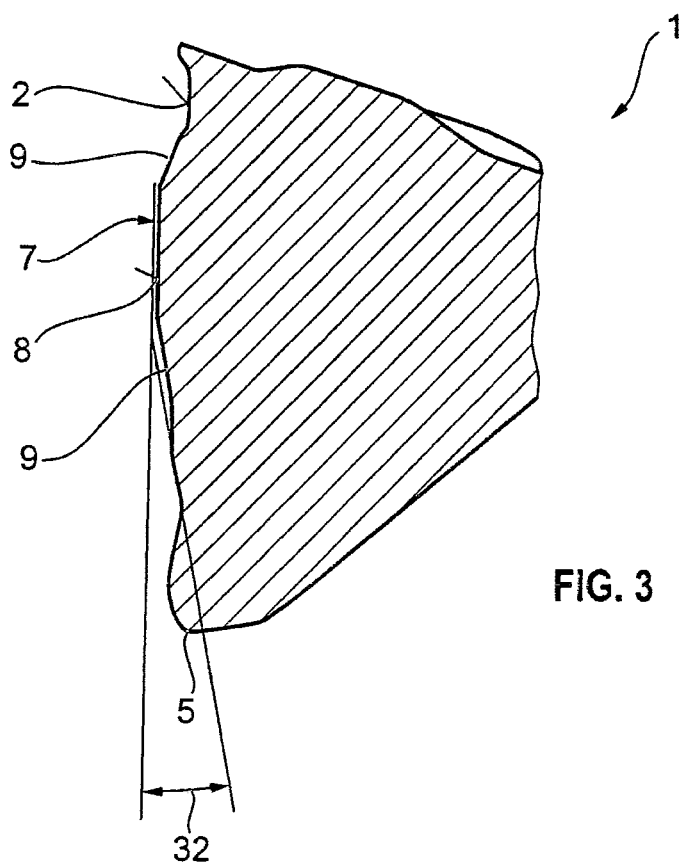
Figure 4:
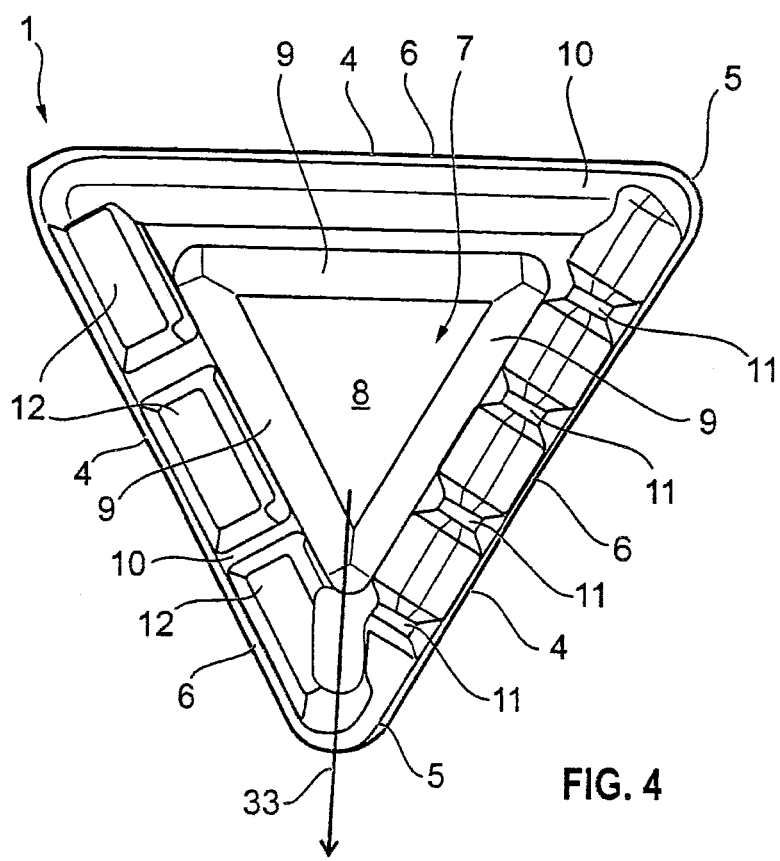
Figure 5:
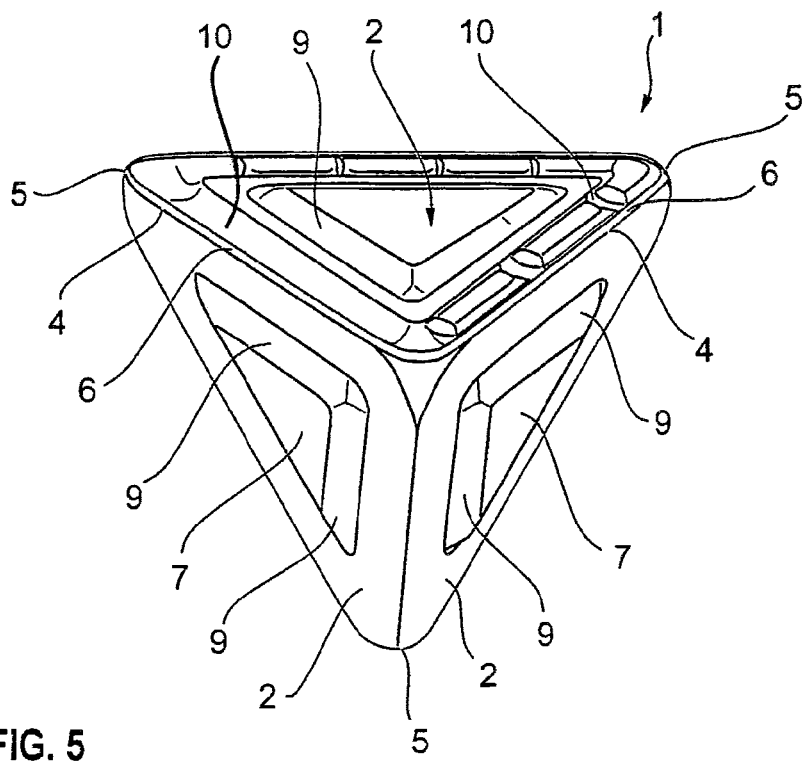
Figure 6:
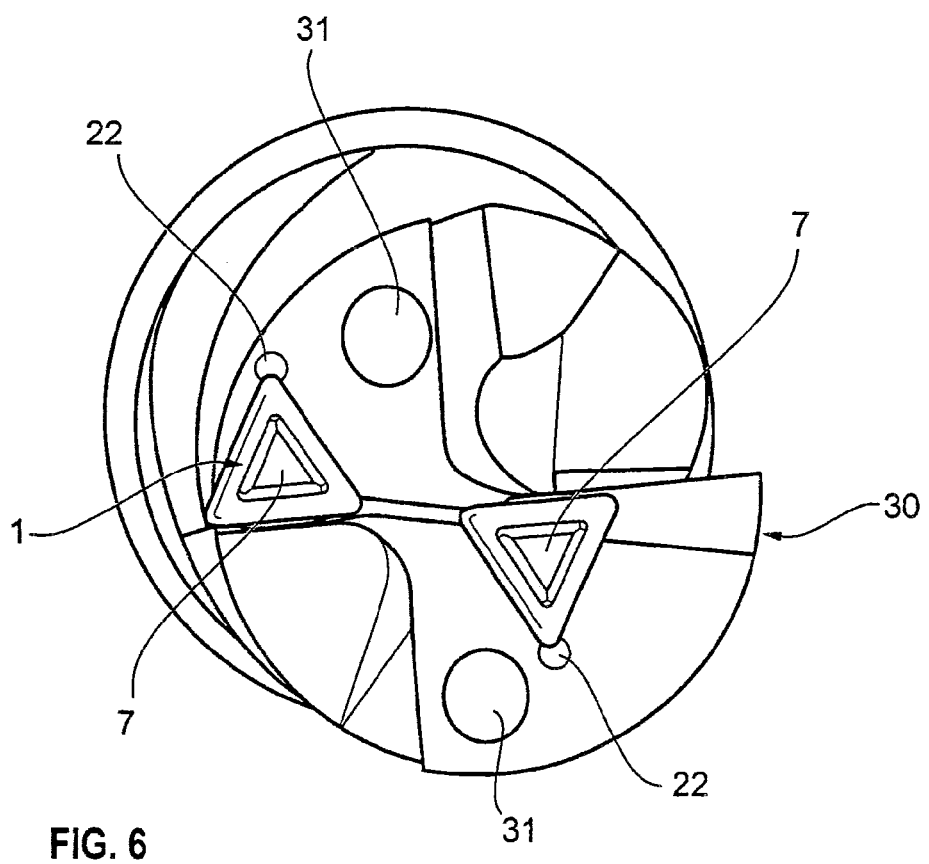

The invention is explained in more detail with reference to an exemplary embodiment. In the drawing:

FIG. 1 shows a synoptic illustration of a tetrahedral cutting insert shown on the left in the figure and of a tool seat shown on the right in the drawing, FIG. 2 shows a detailed illustration of the tool seat with a cutting insert depicted as a bisected torso into the tool seat, FIG. 3 shows a sectioned illustration through the effective plane of a cutting insert, FIG. 4 shows a plan view of a triangle base area, forming the effective plane, of the cutting insert according to the invention, with three differently configured cutting lips, FIG. 5 shows a perspective view of the cutting insert shown in FIG. 4, and FIG. 6 shows a plan view of the borer point of a boring tool according to the invention.

DETAILED DESCRIPTION OF THE IVENTION

The same parts in the various configurations are always provided with the same reference numerals below.

The cutting insert 1 shown on the left in FIG. 1 is configured as a Platonic solid. Each of its base areas 2 has the geometry of an equilateral triangle having a triangle interior angle of 60°. The regular tetrahedron has four congruent base areas 2 with the geometry of an equilateral triangle. The edges of the triangle sides 3 form the cutting edges 4 of the cutting insert 1, which are effective as cutting lips. The nodal points of in each case three abutting triangle sides 3 form in each case a cutting lip corner 5. The cutting insert 1 has four such cutting lip corners 5. These cutting lip corners 5 can be configured for the respective machining purpose. For example, corner rounding or a bevel can be provided. A cutting lip bevel 6 is provided in the region of the cutting edges 4 for stabilizing the cutting lips. Furthermore, the cutting edges 4 can be sharp-edged or can be provided with edge rounding.

A tetrahedral frustum 7 is formed on each base area 2 of the cutting insert 1. This tetrahedral frustum 7 is defined at the top by its top surface 8. The side faces 9 of the tetrahedral frustum 7 taper from the base area 2 to the top surface 8. Shown in the illustration in FIG. 3 is the effective angle 32, which is less than 11° in the exemplary embodiment. This effective angle 32 is produced on the effective area, shown in FIG. 4, in the region of the frustum side face 9 lying behind the active cutting lip corner 5 in the effective direction 33.

In the region of the cutting edges 4 stabilized by the cutting lip bevels 6, chip troughs 10 are formed in the body of the cutting insert 1. Projections configured, for example in the exemplary embodiment in FIG. 4, as chip lugs 11 are provided in the region of the chip troughs 10. Projections in the form of chip strips 12 are formed on the other adjacent chip trough 10 in FIG. 4.

The tool seat 20 is formed substantially by two clamping jaws 21. The clamping jaws 21 each have the shape of an equilateral triangle. In the exemplary embodiment, the clamping jaws 21 are at an angle of 60° to one another. The clamping slot 22 is formed in the tool seat 20 between the clamping jaws 21. An accommodating pocket 23 is formed in each of the clamping jaws 21. The accommodating pocket 23 has the hollow form of a tetrahedral frustum. The side walls 24 of the accommodating pockets 23 extend at an angle of less than 11° in the effective plane toward the root 25 of the accommodating pockets 23.

Furthermore, it can be seen from the synoptic illustration in FIG. 1 and from the illustration in FIG. 2 that the hollow geometry of the accommodating pockets 23 in the tool seat 20 is designed to be complementary to the volumetric geometry of the tetrahedral frustum 7 on the cutting insert 1. In the final fitted position, that is to say when cutting insert 21 is clamped in the tool seat 20, in each case a tetrahedral frustum 7 rests in an accommodating pocket 23 of the clamping jaw 21, assigned to said tetrahedral frustum 7, of the tool seat 20. In this case, the top surface 8 of the tetrahedral frustum 7 and the root 25 of the accommodating pocket 23 are opposite one another in a virtually plane-parallel manner, whereas the frustum side faces 9 act upon the pocket side walls 24 in a clamping and flush manner. The cutting insert 1 is therefore restrained in each case in the clamping jaws 21 via the tetrahedral frustums 7. Stable self-locking of the cutting insert 1 in the tool seat 20 is ensured as a result of this stable clamping seat between the clamping jaws 21 and the base areas 2 assigned to them in each case or the tetrahedral frustums 7 resting in the accommodating pockets 23, when frustum side faces 9 and pocket side walls 24 act upon one another. The cutting insert 1 requires no additional devices in order to be held in the tool seat 20.

The borer point of a boring tool 30 is shown in FIG. 6. It can be seen from the illustration in FIG. 6 that the cutting inserts 1 each have only a very compact size, such that the cooling passages 31 can be provided with a comparatively large cross section.

The boring tool 30 shown in FIG. 6 shows a borer point having a two-part main cutting lip, each part of the main cutting lip including a respective cutting insert 1 according to the invention. In this case, the cutting insert 1 shown on the right in FIG. 6 is designed as a core borer or core cutter, whereas the cutting insert 1 shown on the left in FIG. 6 trails behind the cutting insert 1 shown on the right and is suitable for boring.

The invention claimed is:

1. A cutting insert for a cutting tool, comprising the geometry of a tetrahedron with triangle base areas, wherein each of the triangle base areas has a tetrahedral frustum as a clamping body extending therefrom for fixing the cutting insert in a tool seat of a carrier tool.

2. The cutting insert as claimed in claim 1, wherein the sides of the tetrahedral frustum run parallel to the triangle sides of the base areas.

3. The cutting insert as claimed in claim 1, wherein the frustum side faces run in a tapering manner from the triangle base area up to the top surface of the tetrahedral frustum form clamping surfaces for fixing the cutting insert in the tool seat.

4. The cutting insert as claimed in claim 3, wherein the frustum side faces taper at an angle of less than 11° in the effective direction from the triangle base areas to the top surface.

5. The cutting insert as claimed in claim 1, wherein
    a) four congruent and equilateral triangles form the base areas of the tetrahedron,
    b) the nodal points of three abutting triangle sides of different triangles each forms a base area, and each forms a cutting lip corner, and
    c) the triangle sides of the triangles forming the base areas are formed as cutting edges.

6. The cutting insert as claimed in claim 5, further including a cutting lip bevel flanking the cutting edge.

7. The cutting insert as claimed in claim 5, further including a chip disposal trough located behind the cutting edge.

8. The cutting insert as claimed in claim 5, further including projections effective as chip breakers or chip formers.

9. The cutting insert as claimed in claim 8, wherein 3% to 20% of the length of each cutting edge has a projection.

10. The cutting insert as claimed in claim 9, wherein 5% of the length of each cutting edge has a projection.

11. The cutting insert as claimed in claim 8, wherein the projections are designed as a step-type chip breaker.

12. A tool seat for a cutting insert having the geometry of a tetrahedron with triangle base areas, wherein each of the triangle base areas has a tetrahedral frustum as a clamping body extending therefrom for fixing the cutting insert in a tool seat of a carrier tool, wherein the tool seat has two clamping jaws which are disposed at a clamping angle to one another, adapted to the angle of two adjacent triangle base areas of the cutting insert, and which each have an accommodating pocket designed to be complementary to the corresponding clamping body of the cutting insert, and separated by a clamping slot arranged between the clamping jaws.

13. The tool seat as claimed in claim 12, wherein
    a) the clamping jaws each have the outline shape of an equilateral triangle, and
    b) the accommodating pockets formed in the clamping jaws have the outline shape of an equilateral triangle with pocket side walls tapering in the direction of the clamping jaw interior, namely the pocket root.

14. A cutting tool having at least one cutting insert having the geometry of a tetrahedron with triangle base areas, wherein each of the triangle base areas has a tetrahedral frustum as a clamping body extending therefrom for fixing the cutting insert in a tool seat of a carrier tool and having a tool seat with two clamping jaws which are disposed at a clamping angle to one another, adapted to the angle of two adjacent triangle bases of the cutting insert, and which each have an accommodating pocket designed to be complementary to the corresponding clamping body of the cutting insert and separated by a clamping slot arranged between the clamping jaws.

15. A boring tool having a tool seat for accommodating a cutting insert having the geometry of a tetrahedron with triangle base areas, wherein each of the triangle base areas has a tetrahedral frustum as a clamping body extending therefrom for fixing the cutting insert in a tool seat of a carrier tool, the tool seat having two clamping jaws which are disposed at a clamping angle to one another, adapted to the angle of two adjacent triangle bases of the cutting insert, and which each have an accommodating pocket designed to be complementary to the corresponding clamping body of the cutting insert, and a clamping slot arranged between the clamping jaws at each main cutting lip for accommodating the cutting insert.

16. The cutting insert as claimed in claim 8, wherein the projections are arranged in each case at equal distances apart in the region of the cutting edges.

17. The cutting insert as claimed in claim 16, wherein the projections are arranged in the region of the chip disposal troughs.

18. The tool seat as claimed in claim 13, wherein the taper of the pocket side walls are at an angle of less than 11° in the effective direction.

* * * * *

UNITED STATES PATENT AND TRADEMARK OFFICE
CERTIFICATE OF CORRECTION

PATENT NO.       : 8,459,907 B2
APPLICATION NO. : 12/991270
DATED            : June 11, 2013
INVENTOR(S)      : Peter Karl Mergenthaler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 360 days.

Signed and Sealed this
Eighth Day of September, 2015

Michelle K. Lee
*Director of the United States Patent and Trademark Office*